United States Patent [19]

Isozaki et al.

[11] 4,218,714
[45] Aug. 19, 1980

[54] DOUBLE SIDE TYPE FLEXIBLE MAGNETIC DISC DRIVE APPARATUS

[75] Inventors: Shin Isozaki; Kanji Sakurai, both of Kamakura, Japan

[73] Assignee: Mitsubishi Denki Kabushiki Kaisha, Tokyo, Japan

[21] Appl. No.: 952,191

[22] Filed: Oct. 17, 1978

[30] Foreign Application Priority Data

Oct. 24, 1977 [JP] Japan .................................. 52-127384

[51] Int. Cl.² .................... G11B 5/016; G11B 5/55; G11B 21/12
[52] U.S. Cl. .................................... 360/99; 360/106; 360/105; 360/130.34
[58] Field of Search .................................... 360/97–99, 360/105–107, 109, 130, 133, 135, 86

[56] References Cited

U.S. PATENT DOCUMENTS

| | | | |
|---|---|---|---|
| 2,550,916 | 5/1951 | Davis | 360/105 |
| 3,678,481 | 7/1972 | Dalziel et al. | 360/133 |
| 3,702,997 | 10/1972 | Jamieson | 360/98 |
| 3,800,323 | 3/1974 | Jenkins | 360/109 |
| 3,839,737 | 10/1974 | Vogel | 360/106 |
| 3,879,757 | 4/1975 | Elliott et al. | 360/99 |
| 3,946,439 | 3/1976 | Castrodale et al. | 360/105 |
| 4,024,581 | 5/1977 | Lesca et al. | 360/106 |
| 4,040,106 | 8/1977 | Medley | 360/99 |
| 4,040,107 | 8/1977 | Bryer | 360/99 |
| 4,058,846 | 11/1977 | Knutson | 360/121 |

OTHER PUBLICATIONS

Kakuda et al., Diskette Wear Improvement on Double-Sided Flexible Disk Drive, 3rd USA–Japan Computer Conf. 1978, pp. 355-359.

Primary Examiner—Alfred H. Eddleman
Attorney, Agent, or Firm—Oblon, Fisher, Spivak, McClelland & Maier

[57] ABSTRACT

A double side type flexible magnetic disc drive apparatus comprises a damper which imparts a damping force being proportional to the shifting speed and is held between a head shifting mechanism and a stationary part whereby damage of a flexible magnetic recording medium caused by shifting the heads can be decreased to prolong the life of the recording medium and the time required for reaching stable contacting of the heads with the recording medium can be shortened.

4 Claims, 7 Drawing Figures

DOUBLE SIDE TYPE FLEXIBLE MAGNETIC DISC DRIVE APPARATUS

BACKGROUND OF THE INVENTION

The present invention relates to an improvement of a double side type flexible magnetic disc drive apparatus. More particularly, it relates to a mechanism for shifting one or both magnetic heads and to put it on and off a magnetic recording medium.

The mechanism of the conventional single side type flexible magnetic disc drive apparatus which is widely used will be illustrated as reference.

FIG. 1 shows a schematic view of the mechanism of the conventional flexible magnetic disc drive apparatus and FIG. 2 is sectional view of the mechanism thereof.

In FIGS. 1 and 2, a magnetic head (102) is fixed on a head carriage (101) which is shifted in the direction of the line A through a leading screw (104) by rotation of pulse motor (103). During a recording/reading out of data, a electric magnet (105) is energized, and a flexible recording medium (106) is pressed by a pad (108) mounted on arm (107) and the magnetic head (102) is caused to contact with the recording surface of the medium (106). The flexible recording medium (106) can be held out contact with the magnetic head (102) by lifting up the lift arm (109) at one end of the arm (107) and the pad (108), with a return spring (111) connected through the armature of the magnet which is not energized, and by a lever (110) during waiting or exchanging the recording medium (106). Reference numeral (112) designates a magnetic core of the magnetic head (102) and (113) designates a jacket covering the flexible recording medium.

As described above, in the conventional mechanism, the magnetic head (102) is fixed on the head carriage (101) and the flexible recording medium (106) is pressed by a felt like pad (108) from the rear surface of the recording medium at the corresponding position to attain the recording/reading out of data whereas the pad (108) is lifted up during the waiting time and the exchanging of the recording medium.

It has been considered to use both sides of the flexible magnetic disc recording medium and in that case, it is necessary to engage a pair of magnetic heads corresponding to both surfaces.

The double side type head carriage system has the structure shown in FIGS. 3 and 4 as a conventional embodiment.

FIG. 3 is a schematic view of one embodiment of the conventional double side type head carriage.

FIG. 4a is a sectional view of the head carriage of FIG. 3 in the recording/reading out condition and FIG. 4b is a sectional view of the head carriage of FIG. 3 in the waiting condition.

In FIGS. 3, 4a, and 4b, the reference numeral (1) designates a frame of the double side type head carriage and (2) designates a pair of double side type head sliders which are disposed to face each of the surfaces of the flexible recording medium (3); (4) designates a magnetic core of the double side type head slider (2); (5) designates a jacket covering the flexible recording medium (3); (6) designates leaf spring gimballing mechanisms equipping with the head sliders (2); (7) designates pressing mechanisms for pressing the head sliders (2) to the flexible recording medium (3). It is usual to use the head slider (2), the magnetic core (4), the leaf spring gimballing mechanism (6) and the pressing mechanism (7) as one of pair head assemblies. The head assembly is connected to a head shifting mechanism (8) with a screw (9). A supporting spring (10) is connected to the head shifting mechanism (8) having a lift arm (12) with a screw (11) and the other end of the supporting spring (10) is fixed on the frame (1). Reference numeral (13) designates an electric magnet; (14) designates a returning spring for lifting up the lift arm (12) by the lever (15) in the direction B during the waiting time or the exchanging of the flexible magnetic recording medium; (16) designates a projected part on one end of the head shifting mechanism (8) and the projected part is a hook for lifting up the head sliders (2) in the directions C, C to depart from the flexible magnetic recording medium (3) by hanging the pressing mechanism (7) of the head as shown in FIG. 4b during the waiting time for the recording/reading out or exchanging of the flexible magnetic recording medium.

In order to maintain the magnetic gap of the heads for both surfaces so as to contact with the flexible magnetic recording medium even though a curve or a wave of the flexible magnetic recording medium is found, each flat head slider (2) is disposed at each end of the leaf spring gimballing mechanism (6) and the head sliders (2) are pressed by the head pressing mechanism (7) in the directions D,D. During the waiting time for the recording/reading out or the exchanging of the flexible magnetic recording medium, the head upper and lower member (8) is shifted in the directions C,C by the lift arm (12) and the head pressing mechanism (7) is shifted by hanging a part of the head pressing mechanism by the projected part (16) and the leaf spring gimballing mechanism (6) is shifted by hanging it by a part of the head pressing mechanism (7) whereby the head slider (2) is shifted away from the flexible magnetic recording medium. The lift arm (12) is shifted by lifting the head lifting lever (15) in the direction B with the spring force of the returning spring (14) for the electric magnet (13). At the initiation of the recording/reading out, an attractive force is imparted by the electric magnet (13) to lower the head lifting lever whereby the lift arm (12) is shifted down as shown in FIG. 4a. The heads are lowered to contact with the flexible magnetic recording medium (3) by the spring force of the supporting spring (10) and the head pressing mechanism (7) except upon applying a lifting force to the head shifting mechanism (8) and the head pressing mechanism (7).

The magnetic heads (2) are shifted in the linear direction E through the lead screw (not shown) by the fixed pulse motor (not shown).

In the other embodiment of the double side type flexible magnetic disc drive apparatus, one fixed head used in the single side type apparatus shown in FIGS. 1 and 2 and one flat head slider disposed to face the fixed head shown in FIGS. 3 and 4 are shifted be lifted up and lowered by a lift arm.

In any of the double side type flexible magnetic disc drive apparatus, a pair of head sliders are faced to each other and lowered so as to contact them with the flexible magnetic recording medium or lifted up so as to separated them from the flexible magnetic recording medium. Accordingly, a pair of the hard head sliders impart shock by a collision through the flexible magnetic recording medium when the head sliders are lowered on each surface of the flexible magnetic recording medium. If the collision speed is high, the flexible magnetic recording medium is thus damaged. Upon the collision of the head sliders through the flexible magnetic recording medium, the head sliders are bounced to take certain time until settling to establish good contact of the head sliders with the flexible magnetic recording medium.

In the case of the single side type apparatus, the soft felt like substrate is used on the opposite surface, whereby such trouble is prevented.

In order to give a desired contacting accuracy for the magnetic gap, it is necessary to make the head slider with a hard substance.

In the case of the double side type apparatus, the positions of the magnetic gaps of the heads on both of the surfaces are usually shifted for a small distance of about 2.1 mm in the radial direction of the flexible magnetic recording medium. Accordingly, it is usually difficult to prevent the collision of the head sliders and the life of the flexible magnetic recording medium is, accordingly, usually shortened by the collision of the head sliders in the double side type flexible disc drive apparatus and the time required to reach stable contact of the head sliders with the recording medium is usually prolonged because of bouncing the head due to the collision.

SUMMARY OF THE INVENTION

It is an object of the present invention to overcome these disadvantages of shortening the life of a flexible magnetic recording medium caused by a collision of hard head sliders through the flexible magnetic recording medium and prolonging of the time required to reach stable contact of the head sliders with the flexible magnetic recording medium.

The foregoing object of the present invention has been attained by equipping a pneumatic or hydraulic damper (buffering means) between a movable part for shifting the magnetic head and a stationary part.

DETAILED DESCRIPTION OF THE PREFERRED EMBODIMENTS

Figure 1:
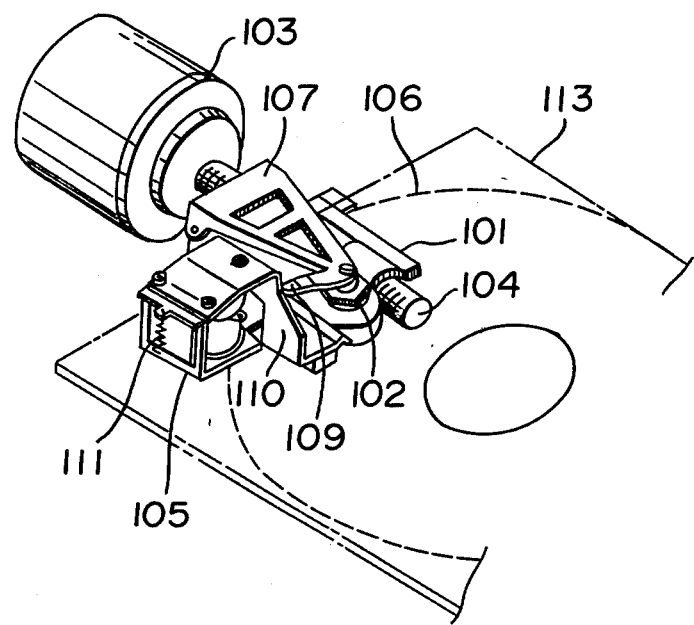
FIG. 1 is a schematic view of a conventional single side type flexible disc drive apparatus.
Figure 2:
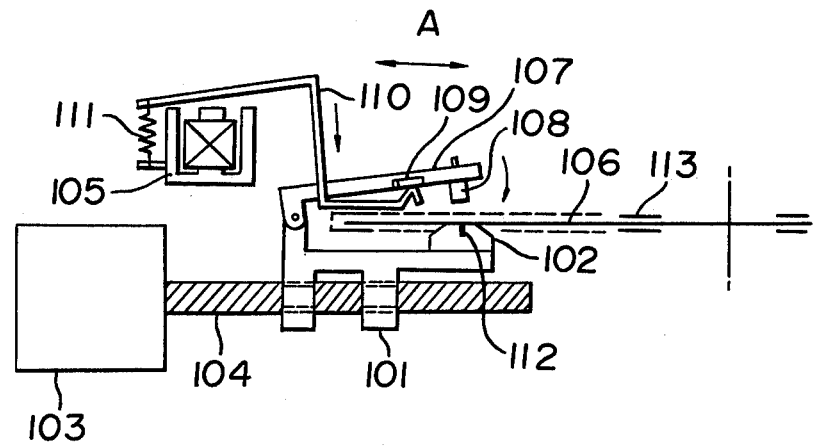
FIG. 2 is a sectional view of the apparatus of FIG. 1 showing the structure.
Figure 3:
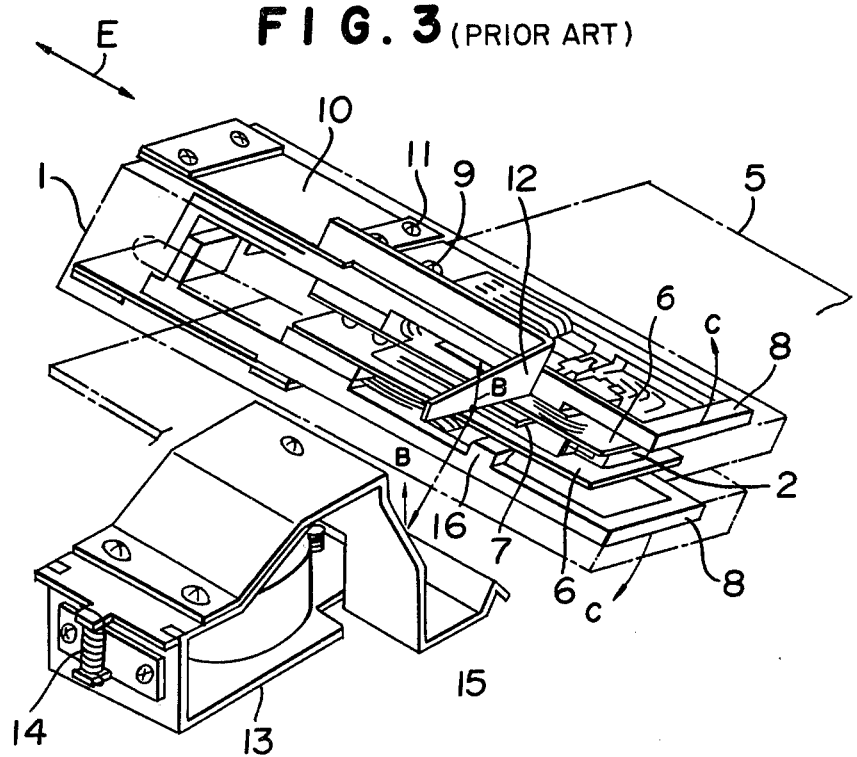
FIG. 3 is a schematic view of a conventional double side type flexible disc drive apparatus.
Figure 4A:
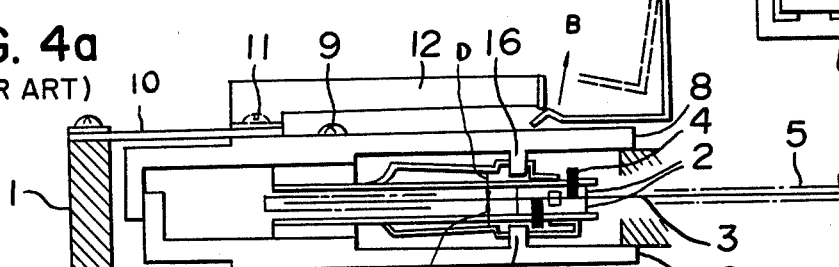
FIGS. 4a, b are sectional views of the apparatus of FIG. 3 showing the structure in two conditions.
Figure 4B:
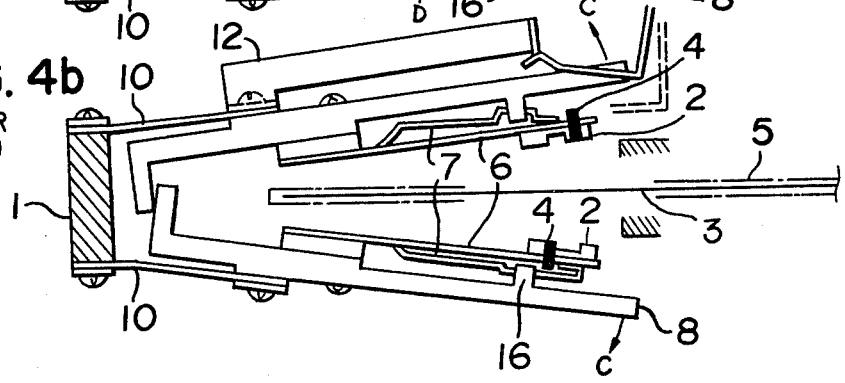
Figure 5:
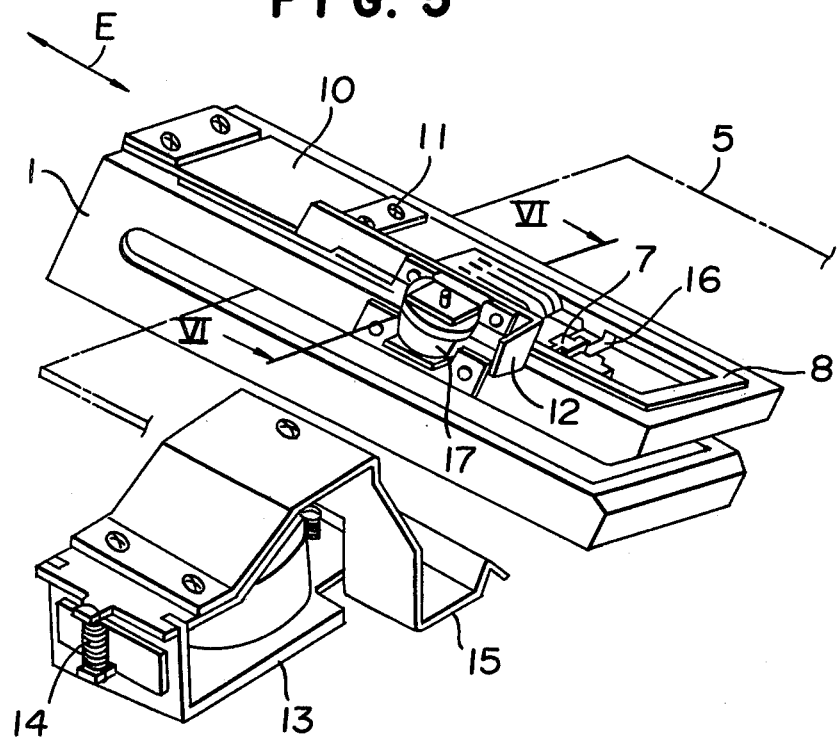
FIG. 5 is a schematic view of one embodiment of the double side type flexible disc drive apparatus according to the present invention.

FIG. 5 shows one embodiment of the present invention wherein the following structure is the same as the structure of the conventional double side type flexible magnetic disc drive apparatus shown in FIGS. 3, 4a and 4b. The returning spring (14) for the electric magnet (13) lifts up the head sliders through the head lifting lever (15), the lift arm (12), the head shifting mechanism (8) and the head pressing mechanism (7). When the electric magnet (13) is actuated to lower the head lifting lever (15), the head sliders (2) (similar to those of FIGS. 3 and 4 though not shown in FIG. 5) are contacted with the flexible magnetic recording medium (3) by the spring force of the pressing mechanism through said structure.

In the embodiment of the present invention, a damper (17) which imparts a reaction being substantially proportional to the relative speed is equipped between the head shifting mechanism (8) and the frame (1) fixed to the head shifting direction whereby the damping force being proportional to the head shifting speed is applied to control the speed of the heads at the time contacting the head sliders (2) with the flexible magnetic recording medium or colliding the head sliders through the flexible recording medium and resulting the damage of the flexible magnetic recording medium caused by the collision of the two head sliders on both surfaces can be remarkably decreased.

The time required to reach the stable contact of the head slider depending upon the bouncing of the heads after the collision can be shortened by the effect of the damper for controlling the collision speed and damping the bouncing movement. Even though it takes a longer time for the initiation of lowering of the heads, stable contact of the head sliders can be attained for shorter time as total times.

Figure 6:
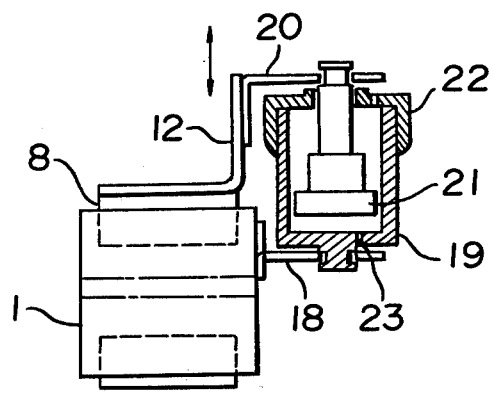
FIG. 6 is a sectional view taken along the line VI—VI of FIG. 5 which shows one embodiment of a structure of a damper and an assembling thereof.

FIG. 6 shows one embodiment of the structure of the damper which attains excellent results. In FIG. 6, reference numeral (18) designates a holder for holding a cylinder (19) which is fixed on the frame (1); (20) designates a holder for holding a piston (21); (22) designates a cylinder cap of the cylinder (19); (23) designates a small hole formed in the cylinder (19) so as to feed and to discharge air.

In the embodiment of FIG. 6, air in the cylinder (19) is compressed by the piston (21) when the head shifting mechanism (8) is lowered and the compressed air is discharged through the small hole (23) to the atmosphere. The reaction being proportional to the piston compressing speed is a result of the resistance for passing the compressed air through the small hole.

The degree of the reaction is greater due to a smaller size of the small hole (23) and larger diameter of the piston (21). The same effect can be expected by utilizing a conventional hydraulic damper instead of the pneumatic damper.

It is also possible to impart suitable damping force by a viscosity resistance given by feeding an oil having suitable viscosity to the sliding part of the piston under the relative movement through the oil membrane.

Thus, the head shifting mechanism (8) is held in the frame (1) which holds the flexible magnetic recording medium (3) in the jacket (5).

As for the structure used, there is usually only narrow space around the frame (1) such that the position holding the damper should be carefully considered.

In the embodiment of the present invention, the head shifting mechanism (8) is lifted up and accordingly, one end of the damper can be connected to the head shifting mechanism (8) held in the frame (1) during the head lowering time when the holder (20) is connected to a part of the lift arm (12) fixed on the head shifting mechanism (8). As for the stationary part corresponding to the connection, the other end of the damper is fixed through the holder (18) to the frame (1) fixed in the carriage which is shifted in the radial direction E of the magnetic recording medium together with the head shifting mechanism (8) and the lift arm (12) in the magnetic track selection on the flexible magnetic recording medium.

The jacket (5) containing the flexible magnetic recording medium (5) is relatively put into and out of the frame. Accordingly, the holder (18) is connected to side of the frame (1) not to interrupt the movement of the jacket (5) and the other end of the damper is connected to the holder (18).

The head shifting mechanism (8) is turned around the spring (10) to the frame (1) as described above and accordingly, it is necessary to provide the structure of the holder for holding the damper with a degree of freedom to the turning of the head shifting mechanism.

The embodiment of the pneumatic damper having a piston structure has been described. The same consideration can be taken in the embodiments of the hydraulic damper and the oil membrane type damper.

The position of damper should be between the head shifting mechanism and the stationary part such as the frame and can be easily selected by a person skilled in the art.

In accordance with the double side flexible magnetic disc drive apparatus of the present invention, the damper which imparts a damping force being proportional to the relative speed is disposed in the head shifting mechanism whereby the damage of the flexible magnetic recording medium caused by shifting the heads in the double side type flexible magnetic disc drive apparatus can be decreased to prolong the life of the flexible recording medium and the time required for reaching stable contacting of the heads with the flexible magnetic recording medium can be shortened such that an excellent apparatus in practical use can be obtained.

What is claimed as new and desired to be secured by Letters Patent of the United States is:

1. In a double side type flexible magnetic disc drive apparatus having a structure such that at least one magnetic head is contacted with at least one surface of a flexible magnetic recording medium during recording and reading out and said at least one magnetic head is positioned a distance from said recording medium during a waiting period or exchanging of said recording medium, an improvement which comprises:
   a head shifting mechanism;
   a frame;
   damper means for imparting a damping force substantially proportional to a shifting speed which interconnects said head shifting mechanism and said frame whereby shock of collision of said at least one magnetic head through said recording medium is decreased and associated bounce of said at least one magnetic head is decreased wherein said damper means comprises a hydraulic damper having a piston and cylinder with a small hole in said cylinder.

2. A double side type flexible magnetic disc drive apparatus according to claim 1, said head shifting mechanism including lift arm means for shifting said at least one magnetic head; and
   said frame including a holder connected thereto such that said damper means is supported between said lift arm means and said holder.

3. In a double side type flexible magnetic disc drive apparatus having a structure such that at least one magnetic head is contacted with both surfaces of a flexible magnetic recording medium during recording and reading out such that each of said at least one magnetic heads are positioned a distance from said recording medium during a waiting period or exchanging of said recording medium, an improvement which comprises:
   a head shifting mechanism;
   a frame; and
   damper means for imparting a damping force substantially proportional to a shifting speed which interconnects the head shifting mechanism and said frame whereby shock of collision of said at least one magnetic head with both surfaces of said recording medium is decreased and associated bounce of each of said at least one magnetic heads is decreased wherein said damper means comprises pneumatic damper having a piston and cylinder with a small hole in said cylinder.

4. A double side type flexible magnetic disc drive apparatus according to claim 3, said head shifting mechanism including lift arm means for shifting said at least one magnetic head; and
   said frame including a holder connected thereto such that said damper means is supported between said lift arm means and said holder.

* * * * *